US00RE34542E

United States Patent [19]

Rockenfeller

[11] E Patent Number: Re. 34,542

[45] Reissued Date of Patent: Feb. 15, 1994

[54] CHEMICAL ENERGY STORAGE SYSTEM

[75] Inventor: Uwe Rockenfeller, Boulder City, Nev.

[73] Assignee: Rocky Research, Boulder City, Nev.

[21] Appl. No.: 691,360

[22] Filed: Apr. 25, 1991

Related U.S. Patent Documents

Reissue of:

[64] Patent No.: 4,823,864
Issued: Apr. 25, 1989
Appl. No.: 215,204
Filed: Jul. 5, 1988

U.S. Applications:

[63] Continuation-in-part of Ser. No. 38,323, Apr. 14, 1987, abandoned.

[51] Int. Cl.[5] ..... F25B 17/02

[52] U.S. Cl. ..... 165/104.12; 62/106; 62/112; 62/477; 62/478; 62/481; 62/484; 62/494

[58] Field of Search ..... 165/104.12; 62/478, 62/477, 481, 484, 494, 112, 106, 485, 482, 480

[56] References Cited

U.S. PATENT DOCUMENTS

| | | | |
|---|---|---|---|
| 1,993,518 | 3/1935 | Maiuri | 62/494 |
| 3,561,227 | 2/1971 | Swearingen | 62/103 |
| 3,973,552 | 8/1976 | Ervin . | |
| 4,010,620 | 3/1977 | Telkes . | |
| 4,044,819 | 8/1977 | Cottingham . | |
| 4,100,092 | 7/1978 | Spauschus et al. . | |
| 4,119,556 | 10/1978 | Chubb . | |
| 4,171,624 | 10/1979 | Meckler et al. | 62/476 |
| 4,178,987 | 12/1979 | Bowman et al. . | |
| 4,186,794 | 2/1980 | Brunberg et al. | 62/478 |
| 4,291,755 | 9/1981 | Minto . | |
| 4,303,121 | 12/1981 | Pangborn . | |
| 4,311,024 | 1/1982 | Itoh et al. | 62/112 |
| 4,410,028 | 10/1983 | Alefeld et al. . | |
| 4,415,465 | 11/1983 | Koike et al. . | |
| 4,458,500 | 7/1984 | Grossman et al. | 62/476 |
| 4,467,785 | 8/1984 | Langford et al. . | |
| 4,491,172 | 1/1985 | Hitchin . | |
| 4,512,388 | 4/1985 | Claar et al. . | |
| 4,532,778 | 8/1985 | Clark et al. | 62/477 |
| 4,540,501 | 9/1985 | Ternes et al. . | |
| 4,561,493 | 12/1985 | Yanadori et al. . | |
| 4,567,736 | 2/1986 | Sluys | 62/494 |
| 4,638,646 | 1/1987 | Kosebi et al. | 62/478 |
| 4,682,476 | 7/1987 | Payre et al. | 62/480 |

FOREIGN PATENT DOCUMENTS

| | | |
|---|---|---|
| 117745 | 7/1982 | Japan . |
| 612 | 3/1981 | PCT Int'l Appl. . |

*Primary Examiner*—Albert W. Davis, Jr.
*Attorney, Agent, or Firm*—Jerry R. Seiler

[57] ABSTRACT

A system for storing chemical energy comprises first and second vessels, the first containing a liquid solution of an alkali or alkaline earth metal hydroxide, halide, or thiocyanate, or ammonium halide or thiocynate at an initial concentration of between about 30% to abotu 80%, by weight, the second vessel containing liquid, a space about the liquid in each vessel and a conduit communicating between the spaces having a valve for selectively allowing liquid vapor to pass between the spaces, means for heating the solution to a temperature above about 80° F., means for cooling the liquid to a temperature below about 55° F., and heat exchange means for transferring heat from the heated solution and for transferring heat to the cooled liquid. Water is the preferred liquid although ammonia, lower alcohols, and polyols such as glycerol, glycols, polyglycols, glycol ethers, lower aliphatic amines and alkanol amines, and mixtures thereof, may be used.

34 Claims, 2 Drawing Sheets

CHEMICAL ENERGY STORAGE SYSTEM

Matter enclosed in heavy brackets [ ] appears in the original patent but forms no part of this reissue specification; matter printed in italics indicates the additions made by reissue.

This application is a continuation-in-part of specification Ser. No. 038,323 filed Apr. 14, 1987 now abandoned.

BACKGROUND OF THE INVENTION

With the high cost of electrical energy required to operate air conditioners or heat pumps for cooling buildings, and particularly with the heavy demands for commercial building cooling systems at peak use hours, attention has been directed to various types of thermal energy storage systems. Such energy storage is advantageous since the building cooling and/or heating and process cooling may be generated and stored during off-peak hours at night when most businesses are normally closed, with the ambient outside temperatures being cooler and municipal power requirements reduced.

Most state of the art thermal energy storage systems are based on a solid to liquid phase change using energy storage in a narrow temperature range. Water based systems using ice storage are especially desirable because of low fluid costs and availability. However, the disadvantages of such systems include low evaporator temperature requirements because thermal gradient forces evaporator temperatures to a level far below 32° F., also reducing the chiller efficiency, incomplete or low phase change, often in the order of about 50% to 55%, and low overall energy density of 80 BTU/lb. However, due to the exceptional environmental acceptability qualities and large availability, water is preferred above more corrosive, volatile, expensive and less readily available energy storage materials.

SUMMARY OF THE INVENTION

The present invention is directed to an energy storage system utilizing the advantages of a phase change of gaseous and liquid water. The energy density of such a phase change is in excess of 1000 BTU/lb. with no solidification or crystallization required. Moreover, the present system utilizes relatively low cost and simple apparatus for taking advantage of the energy storage combined with state of the art heat exchange equipment normally found in modern residential and commercial buildings. These as well as other advantages will be evident from the following description of the invention.

DETAILED DESCRIPTION OF THE PREFERRED EMBODIMENTS

The basic invention comprises charging the energy storage system by heating an aqeuous salt solution and cooling water in separate vessels to a liquid temperature differential of at least 30° F., and preferably 50° F. or more up to about 180° F. differential. The vessels are separated although the space above each liquid in the respective vessels are in communication until the desired vapor mass transfer is completed. Thereafter the spatial communication is terminated until it is desired to discharge the energy stored in the system as will be described hereinafter.

Figure 1:
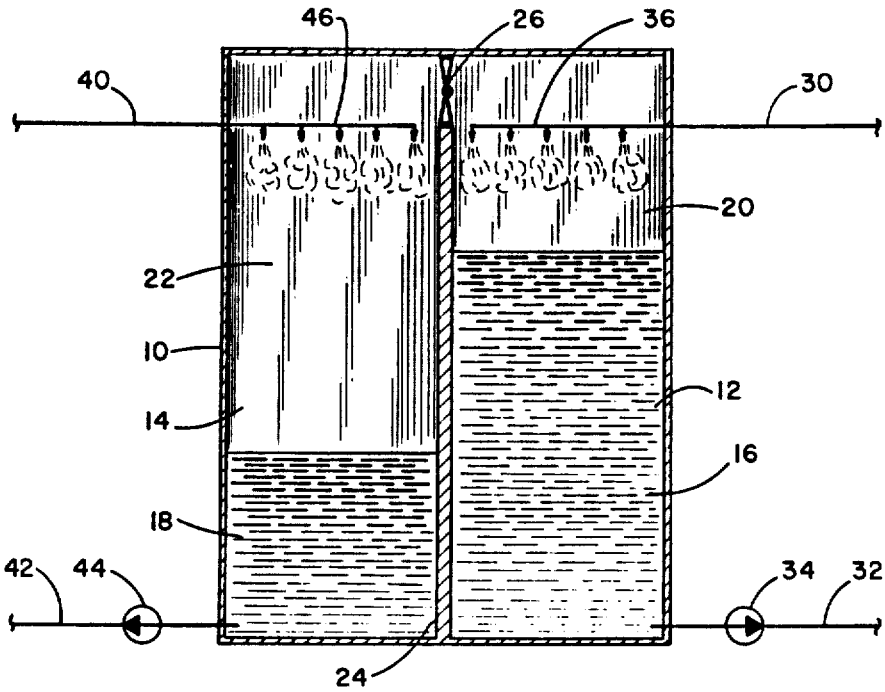
FIG. 1 is a schematic sectional view of a first embodiment of the system of the invention used in direct heat transfer.

In FIG. 1 there is shown an illustration of a first embodiment of the chemical thermal storage system of the invention. The apparatus illustrated schematically comprises a container 10 having two cavities or vessels 12 and 14 separated by a baffle or wall 24. The container must be air-tight so that the two cells or cavities can selectively maintain different vapor pressures. It will be appreciated that although a single container 10 is shown having the two vessels, different containers may be used, the important consideration being that two vessels or cavities are required for holding two different liquids of the system with means for transferring water vapor and communicating vapor pressure differentials between the vessels.

In the preferred embodiment shown, a valve 26 communicates between the spaces of the two vessels above the liquid levels. The valve, conveniently located in wall 24, is preferably a butterfly valve with an orifice of several inches and associated with convenient means for opening and closing the valve. A first liquid composition 16 is located in first vessel 12 and fills the cavity only partially leaving a space 20 above the liquid level. Similarly, in second vessel 14, liquid 18 only partially fills the cavity leaving a second space 22 above the liquid level. It is the spaces 20 and 22 which are in communication via valve 26 which can be selectively opened or closed to allow for water vapor to pass between the two spaces thereby maintaining vapor pressure differential between-the-two-vessels when the valve is closed.

In the first vessel 12 is a liquid solution of a n ammonium halide or thiocyanate, alkali or alkaline earth metal halide, hydroxide or thiocyanate, or mixtures thereof, having initial concentrations of between about 30 and about 80%, and preferably between about 30 and about 80%, and preferably between about 40% and 75%, by weight. In the second vessel 14 is liquid 18. The preferred solvent in vessel 12 and liquid in vessel 14 is water although ammonia and ammonia/water mixtures may be used for low temperature applications. In addition, lower aliphatic amines, lower alkanol amines, alcohols, glycerol, glycols, polyglycols, alkylene glycol ethers and aqueous solutions or mixtures thereof may also be used in combination with water or ammonia. Useful alcohols are those having between 1 and 12 carbon atoms. Lower aliphatic amines and alkanol amines are those of from 1 to about 6 carbon atoms. Examples of the amines are methylamine, ethylamine, etc. while ethanolamine and propanolamine are examples of alkanol amines. Preferred glycols are ethylene glycol and propylene glycol while suitable glycol ethers include ethylene glycol dimethyl ether, diethylene glycol diethyl ether, etc.

Most preferred salts in aqueous systems are the alkali or alkaline earth metal hydroxides especially those of sodium, potassium, cesium, magnesium, lithium, strontium and calcium. Lithium or calcium chloride or bromide are also preferred. Mixtures of the hydroxides may also be used together with lithium chloride or lithium bromide or calcium chloride as well as nitrate salts of those metals as corrosion suppressing additives, in systems where corrosion may be a problem. For ammonium solvent systems, preferred salts include ammonium halides such as ammonium bromide and ammonium chloride, ammonium thiocyanate as well as ammonium metal halide salts, for example $NH_4AlCl_4$, $(NH_4)_2Z_nCl_4$ and $(NH_4)_3Zn\ Cl_5$. The above described organic additives may be used to increase the sorption rates and to increase the differential pressure, as well as to serve as freeze point suppressants in aqueous systems in vessels 12 and 14. For this purpose, plastic vessels or containers which are resistant to the aqueous hydroxide solutions are to be used as 13 are plastic tubing or conduits. Other materials that are lined or coated with compositions which are not susceptible to corrosion when exposed to the strong hydroxide compositions may be used.

The apparatus also includes suitable conduits, pumps and spray nozzle systems for handling the liquids in the respective cavities. Thus, conduits 30 and 32, and pump 34 direct aqueous solution 16 from vessel 12 to a heat exchanger, for example, a condenser of a heat pump or chiller or a waste heat source (not shown) for heating the solution to a desired temperature of at least 30° F. and preferably at least 50° F. higher than the temperature of water in second vessel 14. Preferred solution temperatures are between about 85° and about 130° F. although higher temperatures may be used. The heated solution is then directed to first space 20. A preferred method of returning the heated aqueous solution to the first vessel incorporates a nozzle or spray nozzle system 36 which simply sprays the heated aqueous composition in the form of droplets or a fine mist into first space 20 above the surface of liquid 16 in vessel 12. Any suitable spray nozzle means may be used for this purpose. Similarly, in second vessel 14, water 18 is pumped to a heat exchanger by pump 44 via line 42 where it is cooled, for example, by an air conditioning or heat pump evaporator, cooling tower or other evaporative cooling means or an air to air means after which the cooled water is directed via pipe 40 to second space 22 above the water level using a spray nozzle means 46.

In operating the above-described apparatus in a storage system of the invention, preferably, during the night, or otherwise at relatively low ambient temperature conditions and when area or municipal use loads are at below peak or high requirements, aqueous solution 16 is heated with condenser heat from a building heat pump system, or otherwise heated conveniently to a temperature of above about 85° F. up to about 130° F. At the same time, water 18 is cooled to a temperature of below about 55° F., and preferably below 35° F., using an evaporator from a building heat pump or air conditioning system. Because the vapor pressure of the aqueous solution, for example 42% NaOH, by weight, at 120° F. is higher than the vapor pressure of water at 34° F., the solution will desorb water in the form of water vapor via open valve 26 into second space 22 which condenses into the liquid water 18. This process continues until a solution concentration of approximately 52% of NaOH, by weight, is achieved. At this point, the system is charged, and valve 26 is closed to separate the first and second spaces in the two vessels and maintain vapor pressure differential which thereby allows the charged system to remain stored for an indefinite period of time.

When it is desired to utilize the stored energy in the system created by the above-described charging process, the cold water is circulated to a heat exchanger for the building, for example, passed through a cooling coil in an air handler for cooling the building. During this discharge period, again, the water is pumped via pipe 42 using pump 44 to the building air handler or other heat exchange cooling means, and returned via pipe 40 to second vessel 14 using the spray nozzle device 46. The water thus becomes heated as it absorbs or picks up building heat through the heat transfer system during this discharge phase. Concurrently, hot aqueous solution 16 is pumped via pipe 32 and pump 34 to outside air heat exchangers or coolers such as evaporative coolers, cooling towers and the like thereby cooling the aqueous solution which is then returned via pipe 30 and discharged into first space 20 using a spray apparatus 36.

During this discharge cycle, valve 26 must be opened and because of the difference in vapor pressure between the first and second spaces, 20 and 22 respectively, water is evaporated in second space 22 to provide substantial cooling of the liquid in second vessel 14. At the same time, the evaporated water is passed into first space 20 where it is absorbed into solution 16, which causes a heat of condensation and solutions in first vessel 12, which heat is again exchanged by the outside cooling means (not shown) previously discussed. Alternatively, the heat of condensation and solutions in first vessel 12 may be used for heating purposes, for example in a dual temperature storage capability for building heating and cooling.

Figure 2:
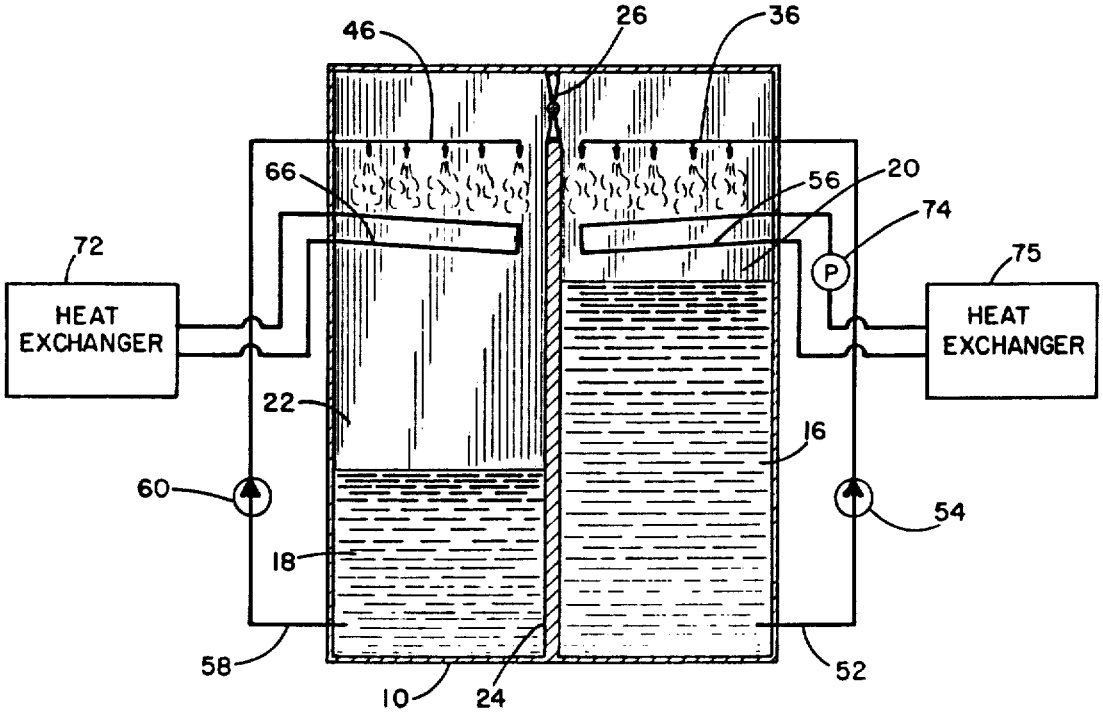
FIG. 2 is a schematic sectional view of the system of the invention using a direct expansion system.

In FIG. 2 there is illustrated another variation or embodiment of a system according to the invention in which a coolant, such as a refrigerant may be directly cooled or condensed at low temperature during discharge of the energy storage system of the invention. Again, a container 10 having two vessels or cavities as illustrated in FIG. 1 may be used with a divider 24 separating the two cavities. The liquid solution 16 and water 18 in the respective containers are substantially like that previously described as is the change of vapor pressure and exchange of water vapor between the cavities 20 and 22, respectively, through valve 26, in both the charging and discharging phases of the operation of the system. In this embodiment, the water is cooled during the charging phase by direct exposure to evaporator coils of an air conditioning system evaporator. For example, the air conditioning system of the building may utilize a cooling conduit 66 which is exposed directly in second cavity 22 through which cold refrigerant is directed during the charging phase. At that time, water 19 will be pumped via pump 60 and conduit 58 and sprayed through spray nozzle apparatus 46 over the cold pipe or coil 66 to be cooled. Concurrently, with valve 26 open during the charging phase, aqueous solution 16 is heated by pumping the solution via pump 54 and conduit 52 through spray nozzle apparatus 36 over heated pipe or coils 56 from a condenser 75 or other heating means including a heat exchanger of the HVAC (heating ventilation air conditioning) equipment condensing the refrigerant. In that case, hot refrigerant may be directed into pipe or coil 56 via pump 74 from the heat exchanger 75. Once the vapor mass transfer between the liquid solution 16 and water 1 is achieved during this charge phase, further heating and cooling, respectively is terminated and valve 26 is closed thereby again maintaining the energy charged in the respective liquids stored until its use is desired.

During discharge, valve 26 is opened, and the respective liquids are pumped through their respective nozzle sprayers over the heat exchange conduits present in the spaces in the respective vessel. Refrigerant directed via conduit or coil 66 is cooled by evaporation of water as water is sprayed over the coil in space 22, the water gradually becoming heated as it picks up heat as it cools the refrigerant from heat exchanger 72. Similarly, in this discharge phase of operation, heat from solution 16 is removed by heat exchanger 75 which similarly pumps a coolant via coil 56 present in space 20.

Figure 3:
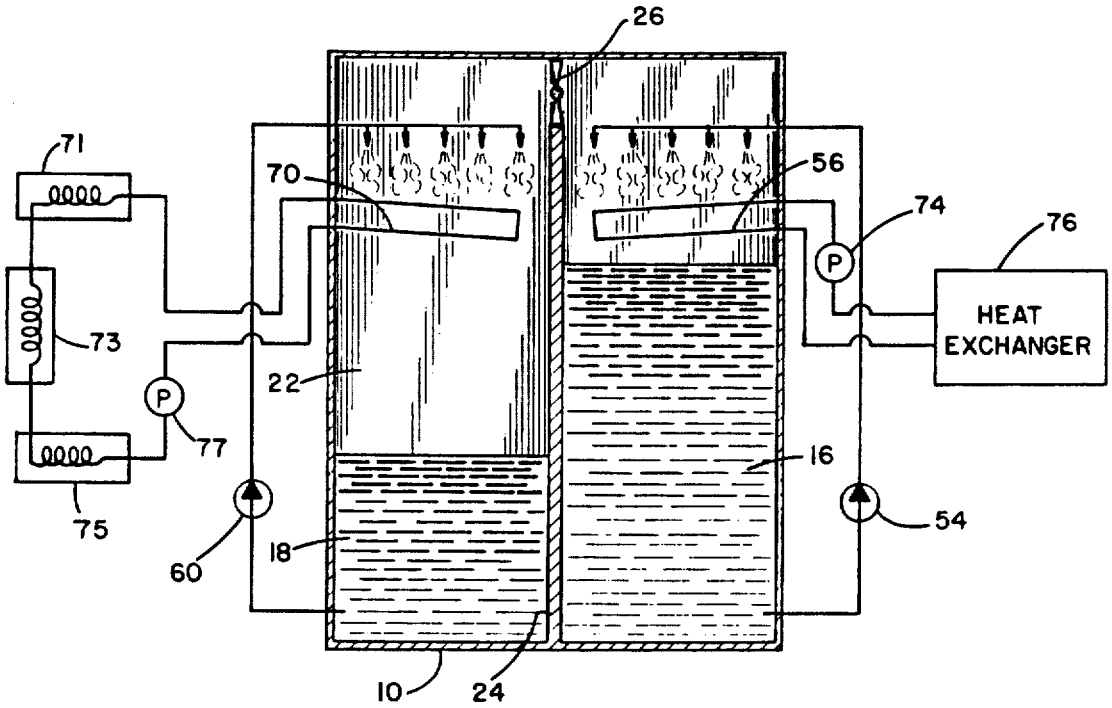
FIG. 3 is a schematic sectional elevation illustrating a system for use in an indirect heat transfer system.

A third apparatus configuration utilizing an indirect heat transfer system is illustrated in FIG. 3. In this apparatus, substantially like that described in FIG. 2, a heat exchanger 76 is used for directly heating and cooling liquid 16 in the charge and discharge phases, respectively of the operation of the system by pumping a heat transfer fluid with pump 74. The heat exchanger illustrated utilizing water with the system is somewhat different in that pump 77 will direct a heat transfer material such as water, ammonia, methanol, glycol-water mixtures, and the like through remote heat exchanger 71, 73 and 79 at various locations throughout a building in which the system is to operate. Pump 77 simply pumps the secondary cooling material via pipe 70 to the respective heat exchangers, with the pipe 70 being exposed in space 22 over which water is sprayed as previously discussed regarding the apparatus shown in FIG. 2.

The specific types of heat exchangers and apparatus used within the purview of the scope of the systems described herein are not so important and other types of systems may be used to achieve the same purpose. Thus, the specific design of the systems shown and described herein are for the purpose of illustration only and the invention is not to be necessarily limited thereto. These as well as other modifications, variations and advantages of the system within the purview of the invention will be evident to those skilled in the art.

I claim:

1. Apparatus for [transferring heat] *alternately charging and discharging thermal energy* comprising a first vessel containing a liquid solution of a compound selected from the group consisting of alkali and alkaline earth metal hydroxide, halide and thiocyanate, ammonium halide, *ammonium metal halide* and thiocyanate, and mixtures thereof, said solution having an initial concentration of between about 30% and about 80% by weight of said compound, said liquid selected from the group consisting of water, ammonia, an alcohol having between 1 and 8 carbon atoms, glycerol, glycols, polyglycols, glycol ethers, aliphatic amines and alkanol amines having between 1 and about 6 carbon atoms, and mixtures thereof, and a first space above the level of said liquid solution and means for pumping said liquid solution to distribution means for directing said liquid solution into said first space, a second vessel containing said liquid without said compound therein, and a second space above the level of said liquid and means for pumping said liquid to distribution means for directing said liquid solution into said second space, both said first and second vessels being closed to atmosphere and capable of holding a vacuum, conduit means communicating between said first space and second space for allowing liquid vapor and pressure changes to pass therebetween, and valve means cooperating with said conduit means for terminating communication between said spaces, heating means [for] *capable of* heating said solution to a temperature of above about [90°] *85°* F., and cooling means [for] *capable of* cooling said liquid to a temperature below about 55° F. *during said charging*, first heat exchange means cooperating with said first vessel for transferring heat from heated solution therein, and second heat exchange means cooperating with said second vessel for transferring heat to liquid therein *during said discharging*.

2. Apparatus of claim said first and second vessels comprise first and second chambers in a divided tank, respectively.

3. Apparatus of claim 2 wherein said conduit means comprises port means communicating between said first and second spaces, and wherein said valve means opens and closes said port means

4. Apparatus of claim 1 including first pipe means and first pump means for directing said solution between said first vessel and said first heat exchange means, and second pipe means and second pump means for directing said liquid between said second vessel and said second heat exchange means.

5. Apparatus of claim 4 wherein said first heat exchange means comprises a heat pump condenser, and said second heat exchange means comprises a heat pump evaporator.

6. Apparatus of claim 4 wherein said [first heat exchanger] *heating* means comprises waste heat or solar heat means.

7. Apparatus of claim 1 wherein said first heat exchange means includes a first heat exchange pipe exposed in said first space and wherein said distribution means directs said solution over the first heat exchange pipe in said first space.

8. Apparatus of claim 7 including spray means for spraying said solution over said first heat exchange pipe.

9. Apparatus of claim 7 wherein said first heat exchange pipe comprises a condenser coil.

10. Apparatus of claim 1 wherein said second heat exchange means includes a second heat exchange pipe exposed in said second space and wherein said distribution means directs said liquid over said second heat exchange pipe.

11. Apparatus of claim 10 including spray means for spraying said liquid over said second heat exchange pipe.

12. Apparatus of claim 10 wherein said second heat exchange pipe comprises an evaporator coil.

[13. Apparatus of claim 1 wherein said first heat exchange means include evaporative or air to air cooling means and first supplemental heat transfer means comprising a first conduit loop having heat transfer liquid therein and a pump cooperating therewith for pumping said heat transfer liquid through said first conduit loop, said first conduit loop extending between said first space and said evaporative or air to air cooling means.]

14. Apparatus of claim [13] *15* including spray means for spraying said solution over said first conduit loop in said first space.

15. Apparatus for [of claim 13] *alternately charging and discharging thermal energy comprising*

*a first vessel containing a liquid solution of a compound selected from the group consisting of alkali and alkaline earth metal hydroxide, halide and thiocyanate,*

*ammonium halide, metal halide and thiocyanate, and mixtures thereof, said solution having an initial concentration of between about 30% and about 80%, by weight of said compound, said liquid selected from the group consisting of water, ammonia, an alcohol having between 1 and 8 carbon atoms, glycerol, glycols, polyglycols, glycol ethers, aliphatic amines and alkanol amines having between 1 and about 6 carbon atoms, and mixtures thereof, and a first space above the level of said liquid solution and means for pumping said liquid to distribution means for directing said liquid into said first space,*

*a second vessel containing said liquid without said compound therein, and a second space above the level of said liquid and means for pumping said liquid to distribution means for directing said liquid into said second space,*

*both said first and second vessels being closed to atmosphere and capable of holding a vacuum,*

*conduit means communicating between said first space and said second space for allowing liquid vapor and pressure changes to pass therebetween, and valve means cooperating with said conduit means for terminating communication between said spaces,*

*heating means capable of heating said solution to temperature of above about 85° F., and cooling means capable of cooling said liquid to a temperature below about 55° F., during said charging,*

*first heat exchange means cooperating with said first vessel for transferring heat from heated solution therein, and second heat exchange means cooperating with said second vessel for transferring heat to liquid therein during said discharging,*

*wherein said first heat exchange means include evaporative or air to air cooling means and first supplemental heat transfer means comprising a first conduit loop having heat transfer liquid therein and a pump cooperating therewith for pumping said heat transfer liquid through said first conduit loop, said first conduit loop extending between said first space and said evaporative or air to air cooling means, and* wherein said second heat exchange means includes a heat pump evaporator and second supplemental heat transfer means comprising a second conduit loop having a heat transfer liquid therein and a pump cooperating therewith for pumping said heat transfer liquid through said second conduit loop said second conduit loop extending between said second space and said evaporator.

16. Apparatus of claim 15 including spray means for spraying said liquid over said second conduit loop in said second space.

17. A [heat exchange] process *for alternately storing and discharging thermal energy* utilizing the apparatus of claim 1 comprising:

(a) opening said valve means, (b) heating said solution in said first vessel to a temperature of above about 85° F. *by exposing said solution to said heating means* and evaporating liquid therefrom, directing the liquid vapor from the space in said first vessel to the space in said second vessel through said conduit means, concurrently cooling the liquid in said second vessel to a temperature below about 55° F, *by exposing said liquid to said cooling means* and condensing the [water] *liquid* vapor in the space therein and continuing said heating and cooling until the concentration of said material in said first vessel is between about 6% and about 25% greater than said initial concentration, (c) terminating said heating of said solution and said cooling of said liquid and closing said valve means thereby closing communication between said spaces in said first and second vessels, (d) selectively opening said valve whereby liquid therein is evaporated thereby cooling said liquid in said second vessel as liquid vapor pressure differential between said first and second vessel is eliminated, (e) exposing said liquid in said second vessel to heat exchange means and pumping said liquid to said distribution means and spraying said pumped liquid into said second space [;], and (f) concurrently with step (e) exposing said solution in said first vessel to heat exchange means and pumping said solution to said distribution means and spraying said pumped solution into said first space.

18. Process of claim 17 wherein said solution is heated to above [80°] *85°* F. in step (b) by directing said solution to a heat pump condenser or solar or waste heat source and exposing said solution to heated elements thereof.

19. Process of claim 18 wherein said liquid is cooled below about 55° F. by directing said liquid to a heat pump *or air conditioning* evaporator and exposing said liquid to cooled elements thereof.

20. Process of claim 17 wherein said liquid is cooled to below about 55° F. in step (b) by directing said liquid to a heat pump *or air conditioning* evaporator and exposing said liquid to cooled elements thereof.

21. Process of claim 20 wherein said cooled liquid from step (e) is directed to a heat exchange evaporator for cooling elements thereof.

22. Process of claim 17 comprising providing elements of said first heat exchange means in said first space and providing elements of said second heat exchange means in said second space and spraying said liquid over said elements of said second heat exchange means in step (e) and spraying said solution over said elements of said first exchange means in step (f).

23. Process of claim 22 comprising providing said heat exchange elements in said second space and spraying said elements with said liquid.

*24. Apparatus of claim 1 wherein said liquid comprises water or a mixture of water and ammonia, and said compound is selected from the group consisting of an alkali and alkaline earth metal hydroxide, calcium chloride, calcium bromide, and mixtures thereof.*

*25. Apparatus of claim 1 wherein said cooling means for cooling said liquid to a temperature below about 55° F. comprises a heat pump or air conditioning evaporator.*

*26. Apparatus of claim 1 wherein said liquid comprises ammonia, and wherein said compound is selected from the group consisting of ammonium halide, ammonium metal halide and ammonium thiocyanate.*

*27. Apparatus for alternately charging and discharging thermal energy comprising:*

*a first vessel containing a liquid solution of a compound selected from the group consisting of alkali and alkaline earth metal hydroxide, halide and thiocyanate, ammonium halide and thiocyanate, and mixtures thereof, said solution having an initial concentration of between about* 30% and about 80%, by weight of said compound, said liquid selected from the group consisting of water, ammonia, an alcohol having between 1 and 8 carbon atoms, glycerol, glycols, polyglycols, glycol ethers, aliphatic amines and alkanol amines having between 1 and about 6 carbon atoms, and mixtures thereof, and a first space above the level of said liquid solution and means for pumping said liquid solution to distribution means for directing said liquid solution into said first space,

*a second vessel containing said liquid without said compound therein, and a second space above the level of said liquid and means for pumping said liquid to distribution means for directing said liquid into said second space,*

*both said first and second vessels being closed to atmosphere and capable of holding a vacuum,*

*conduit means communicating between said first space and said second space for allowing liquid vapor and pressure changes to pass therebetween, and valve means cooperating with said conduit means for terminating communication between said spaces,*

*means for charging said thermal energy comprising heating means capable of heating said solution to a temperature of above about 85° F., and cooling means capable of cooling said liquid to a temperature below about 35° F.,*

*means for discharging said thermal energy comprising first heat exchange means cooperating with said first vessel for transferring heat from heated solution therein, and*

*second heat exchange means cooperating with said second vessel for utilizing the thermal energy benefit of the cooled liquid o provide cooling to air conditioner or heat pump cooling heat exchange means during said discharging.*

*28. Apparatus of claim 27 wherein said cooling means comprises a heat pump or refrigeration system evaporator.*

*29. A method for utilizing the apparatus of claim 27 comprising:*

*charging thermal energy to said apparatus at night or during period of reduced demand for electrical power by opening said valve means, heating said solution in said first vessel to a temperature of above about 85° F. and evaporating liquid therefrom, directing the liquid vapor from the space in said first vessel to the space in said second vessel through said conduit means, concurrently cooling the liquid in said second vessel to a temperature below about 55° F. and condensing the water vapor in the space therein,*

*terminating said heating of said solution and said cooling of said liquid and closing said valve means thereby closing communication between said spaces in said first and second vessels;*

*discharging thermal energy from said apparatus during the day or period of higher demand of electrical power by exposing said cooled liquid in said second vessel to air conditioner or heat pump cooling heat exchange means whereby said cooled liquid becomes heated by said exposure, and*

*pumping said liquid to said distribution means and spraying said pumped liquid into said second space and opening said valve whereby heated liquid therein is evaporated thereby cooling said liquid in said second vessel as liquid vapor pressure differential between said first and second vessels is eliminated, exposing said solution in said first vessel to heat exchange means and pumping said solution to said distribution means and spraying said pumped solution into said first space.*

*30. Method of claim 29 wherein said liquid is cooled to a temperature of below about 35° F. during said charging.*

*31. Method of claim 30 wherein said solution is heated to between about 85° F. and about 130° F. during said charging.*

*32. Method of claim 31 wherein heating said solution during said charging is carried out by exposing said solution to a heat exchanger of a heat pump or refrigeration apparatus condenser.*

*33. Method of claim 31 wherein said cooling said liquid during said charging is carried out by exposing said liquid to a heat exchanger of an evaporator of a heat pump or air conditioning system.*

*34. Method of claim 31 including continuing said heating and cooling during said charging until the concentration of said compound in said first vessel is between about 6% and about 25% greater than said initial concentration.*

*35. Apparatus alternately storing and discharging thermal energy comprising*

*a first vessel containing a liquid solution of a compound selected from the group consisting of alkali and alkaline earth metal hydroxide, halide and thiocyanate, ammonium halide, metal halide and thiocyanate, and mixtures thereof, said solution having an initial concentration of between about 30% and about 80%, by weight of said compound, said liquid selected from the group consisting of water, ammonia, an alcohol having between 1 and 8 carbon atoms, glycerol, glycols, polyglycols, glycol ethers, aliphatic amines and alkanol amines having between 1 and about 6 carbon atoms, and mixtures thereof, and a first space above the level of said liquid solution and means for pumping said liquid solution to distribution into said first space, a second vessel containing said liquid without said compound therein, and*

*a second space above the level of said liquid and means for pumping said liquid to distribution means for directing said liquid into said second space,*

*both said first and second vessel being closed to atmosphere and capable of holding a vacuum,*

*conduit means communicating between said first space and said second space for allowing liquid vapor and pressure changes to pass therebetween, and valve means cooperating with said conduit means for terminating communication between said spaces,*

*heating means for heating said solution to a temperature of above about 85° F., and cooling means comprising a heat pump or air conditioning system evaporator for cooling said liquid to a temperature below about 55° F.,*

*first heat exchange means cooperating with said first vessel for transferring heat from heated solution therein, and second heat exchange means cooperating with said second vessel for transferring heat to liquid therein.*

* * * * *